US011456586B2

(12) United States Patent
Todd

(10) Patent No.: US 11,456,586 B2
(45) Date of Patent: Sep. 27, 2022

(54) CABLE ASSEMBLY FOR CONFIGURING POWER AND CONTROL LINES

(71) Applicant: Halliburton Energy Services, Inc., Houston, TX (US)

(72) Inventor: David Norman Todd, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 563 days.

(21) Appl. No.: 16/493,129

(22) PCT Filed: Apr. 18, 2017

(86) PCT No.: PCT/US2017/028037
§ 371 (c)(1),
(2) Date: Sep. 11, 2019

(87) PCT Pub. No.: WO2018/194556
PCT Pub. Date: Oct. 25, 2018

(65) Prior Publication Data
US 2020/0083692 A1    Mar. 12, 2020

(51) Int. Cl.
*H02G 15/02* (2006.01)
*H02G 9/04* (2006.01)
(Continued)

(52) U.S. Cl.
CPC ............ *H02G 9/04* (2013.01); *H01R 13/60* (2013.01); *H01R 25/00* (2013.01); *H02B 1/52* (2013.01); *H02G 1/06* (2013.01); *H02G 15/06* (2013.01)

(58) Field of Classification Search
CPC ............ H02G 9/04; H02G 1/06; H02G 15/06; H02G 15/00; H02G 15/064; H02G 1/00;
(Continued)

(56) References Cited

U.S. PATENT DOCUMENTS 2,317,450 A * 4/1943 Folds .................. H02G 15/076
174/60
2,324,791 A * 7/1943 McLoughlin ............ H02G 3/26
174/650

(Continued)

FOREIGN PATENT DOCUMENTS

JP    2008-252310 A    10/2008
JP        5579517 B2    8/2014
(Continued)

OTHER PUBLICATIONS

International Search Report and Written Opinion issued in related PCT Application No. PCT/US2017/028037 dated Dec. 28, 2017, 11 pages.

*Primary Examiner* — Angel R Estrada
(74) *Attorney, Agent, or Firm* — Conley Rose, P.C.; Rodney B. Carroll

(57) ABSTRACT

Cabling of equipment at a work site may require lengthy or bulky lines or cables to be run from a power source. A system of cabling control to reduce the length and weight of cables or lines is disclosed. The system uses cable assemblies coupled to work site equipment to facilitate quick and easy coupling and decoupling of cables or lines. The disclosed cabling system may provide for more efficient set up or configuration of a location and operation of work site equipment.

25 Claims, 6 Drawing Sheets

(51) Int. Cl.
*H01R 13/60* (2006.01)
*H01R 25/00* (2006.01)
*H02B 1/52* (2006.01)
*H02G 1/06* (2006.01)
*H02G 15/06* (2006.01)

(58) Field of Classification Search
CPC .......... H02G 9/00; H02G 15/02; H02G 15/08; H01R 13/60; H01R 25/00; H01R 13/62; H01R 31/06; H02B 1/52; H02B 1/34; H02B 7/00; H02B 1/00; H04L 25/03; H04B 3/36; H01H 45/04; H01B 1/00; H01B 9/00
USPC ........ 174/60, 68.1, 68.3, 72 A; 248/68.1, 49
See application file for complete search history.

(56) References Cited

U.S. PATENT DOCUMENTS

| | | | |
|---|---|---|---|
| 7,259,325 B2* | 8/2007 | Pincu | H04Q 1/021 174/68.3 |
| 7,521,634 B2* | 4/2009 | Clem | G01R 1/06788 174/72 A |
| 7,575,480 B2* | 8/2009 | Heller | H02G 3/0481 174/72 A |
| 8,841,563 B2* | 9/2014 | O'Neil | H02G 15/117 174/68.1 |
| 2003/0047342 A1 | 3/2003 | Rotta et al. | |

FOREIGN PATENT DOCUMENTS

| | | |
|---|---|---|
| JP | 5843957 B2 | 1/2016 |
| KR | 10-0132249 B1 | 8/1998 |

* cited by examiner

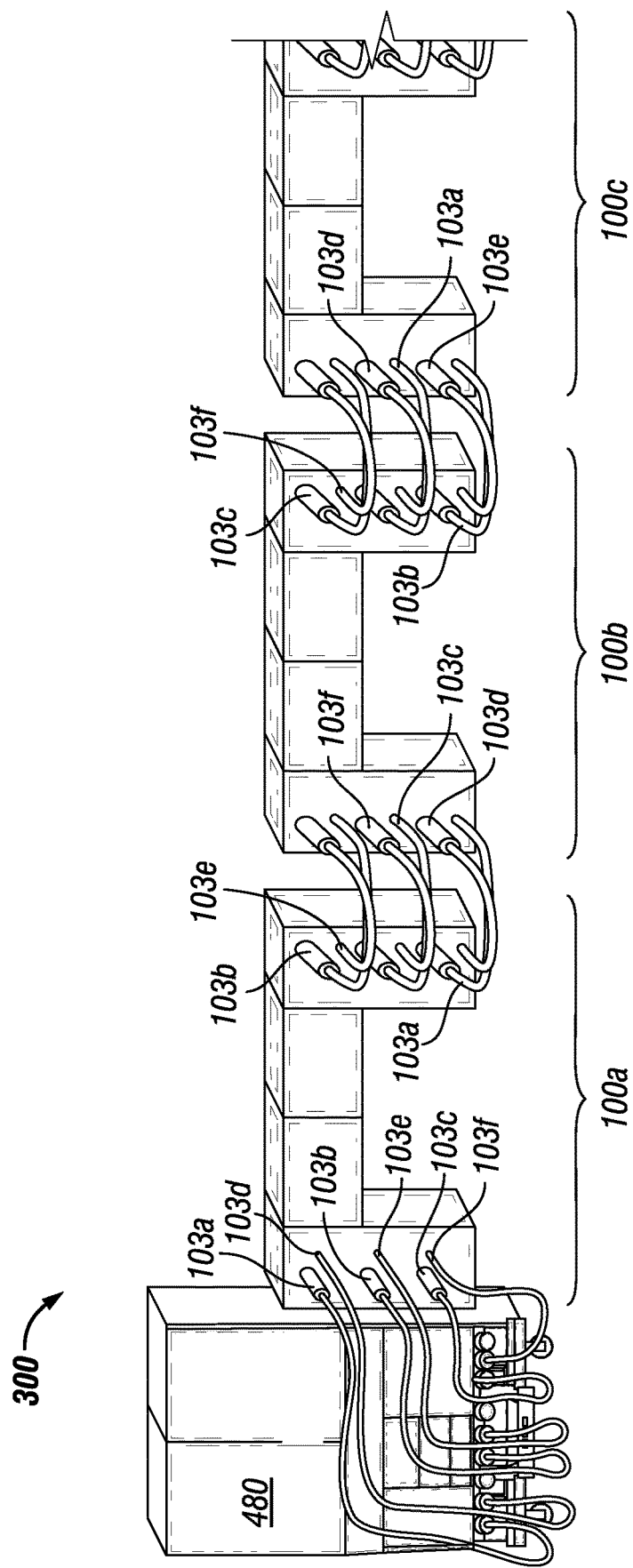

CABLE ASSEMBLY FOR CONFIGURING POWER AND CONTROL LINES

CROSS-REFERENCE TO RELATED APPLICATION

The present application is a U.S. National Stage Application of International Application No. PCT/US2017/028037 filed Apr. 18, 2017, which is incorporated herein by reference in its entirety for all purposes.

TECHNICAL FIELD OF THE INVENTION

The present disclosure relates generally to a cable assembly for configuring and distributing lines or cables to equipment at a location, and more particularly, a cable assembly for configuring one or more cables or lines to distribute power and control signals to equipment at a location.

BACKGROUND

Many types of operations require the use of a fast, easy, and safe method to couple power and control lines or cables to equipment or devices at a location. Such cabling may be heavy and cumbersome to move about a location. In certain environments or locations, equipment or devices may be located at a distance from a power source requiring coupling of lengthy lines or cables. For example, a well services or production operation may require a power source to be coupled to one or more stimulation pumps or other well services and production equipment or devices at a well site at a distance such that coupling and decoupling of cabling or lines may be time consuming and require additional equipment and personnel.

Additionally, during travel, loose cables must be stored and appropriately covered to prevent contamination of any associated plugs and sockets. This contamination and general lack of organization of loose cables may create unnecessary delay in setting up equipment or devices at a location, for example, during rig up operations at a well services and production location. A reduction in the length and weight of cables or lines may reduce costs associated with set up or configuration of a location, provide a safer operating environment, and increase efficiency of operations at the location.

BRIEF DESCRIPTION OF THE DRAWINGS

These drawings illustrate certain aspects of one or more of the embodiments of the present disclosure, and should not be used to limit or define the claims.

FIG. 3 is a diagram of a cable assembly system, comprising a plurality of cable assemblies in an active configuration, according to one or more aspects of the present disclosure.

DETAILED DESCRIPTION

Figure 1:
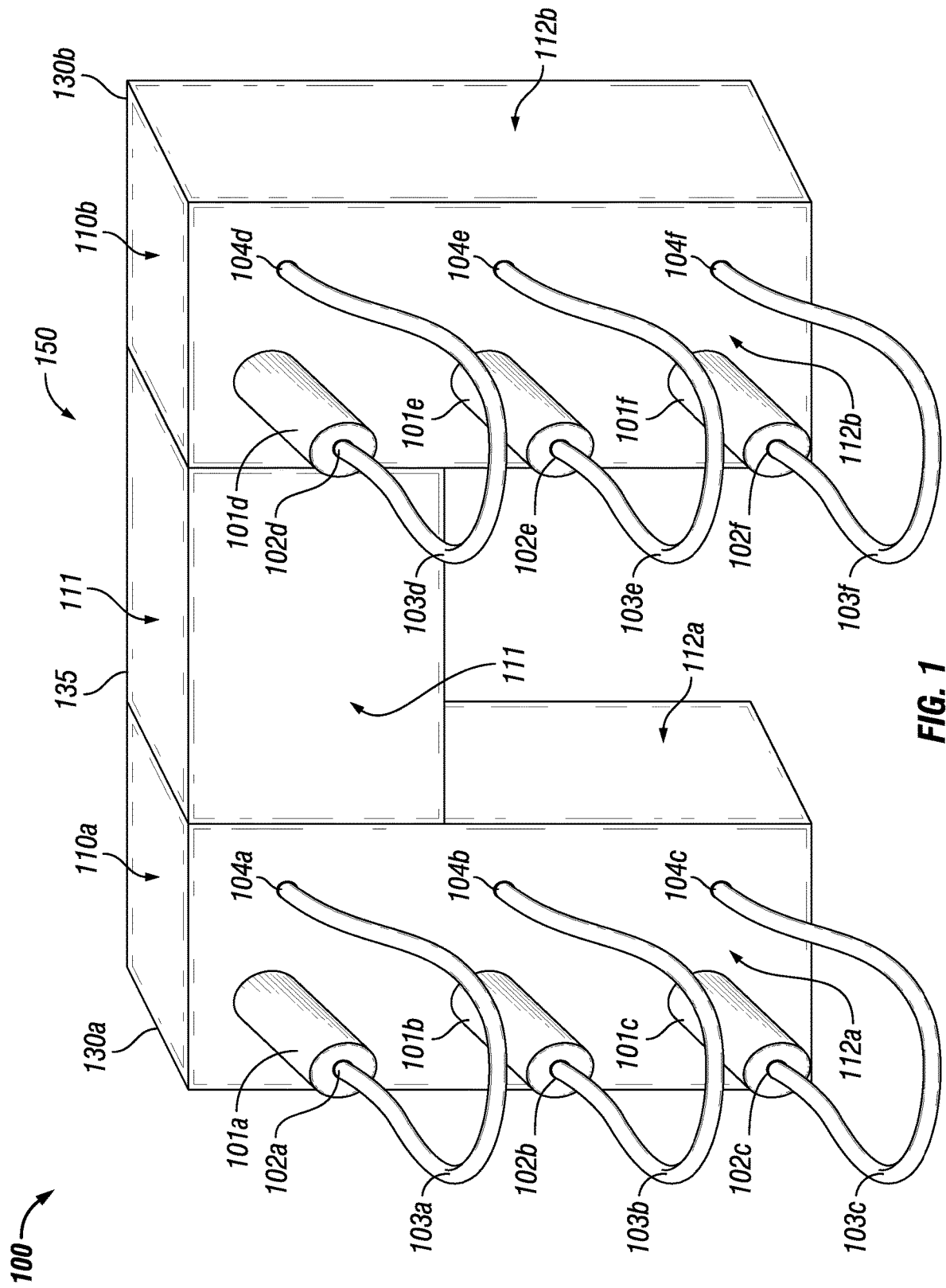
FIG. 1 is a diagram of a cable assembly in an inactive configuration, according to one or more aspects of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The present disclosure relates to a cable assembly to provide efficient and safe distribution of cables or lines at a location. For example, a cable assembly may provide distribution of power or control signals to one or more devices or equipment at a location, such as, to one or more pumps at a well services and production location. While one or more aspects of the present disclosure relate to a cabling assembly for equipment at a well services location, well production location or both, the present disclosure contemplates a cabling configuration for any type of equipment or at any type of location.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

FIG. 1. depicts a diagram of a cable assembly 100 in an inactive configuration. Cable assembly 100 may comprise a frame 150 (for example, a yoke or cable housing), one or more sockets 101a, 101b, 101c, 101d, 101e, 101f (referred to collectively as "sockets 101"), one or more plugs 102a, 102b, 102c, 102d, 102e, 102f (referred to collectively as "plugs 102"), and one or more cables 103a, 103b, 103c, 103d, 103e, 103f (referred to collectively as "cables 103"). Frame 150 comprises a side support 130a and a side support 130b. Side support 130a and side support 130b are coupled together by a middle support 135. In one or more embodiments, side support 130, side support 130b and middle support 135 are formed from a single component or a combination of components. Side support 130a comprises at least one outer face 112a and at least one base face 110a. Side support 130b comprises at least one outer face 112b and at least one base face 110B. For example, as illustrated in FIG. 1, side support 130a comprises four outer faces 112a and two base faces 110a (for example, a top face and a bottom face) and side support 130b comprises four outer faces 112b and two base faces 110b (for example, a top face and a bottom face. Middle support 135 comprises at least one outer face 111. While side support 130a, side support 130b and middle support 135 are each illustrated as comprising a rectangular shape, the present disclosure contemplates that side support 130a, side support 130b and middle support 135 may comprise any one or more shapes.

Sockets 101 may be disposed, positioned, coupled, or mounted to, along, at, or about a front surface 112 of cable assembly 100. In one or more embodiments, sockets 101 may be positioned or disposed in any one or more orientations (for example, vertically or horizontally) and positioned at any location along, at, or about the cable assembly 100 (for example, at or about a top surface 110 or a side surface 111). A socket 101 may comprise steel, metal, or any other conductive material. Each socket 101 may couple to or mate with a corresponding plug 102.

A plug 102 may comprise one or more prongs or pins that are received by a socket 101. Plug 102 may comprise any one or more of a conducting material including, but not limited to, any one or more of brass, copper and metal, an insulating material (such as any one or more of rubber, plastic and glass, a safety material, and any other materials). In one or more embodiments, plug 102 comprises a safety material, for example, a fuse. A fuse may comprise a wire designed or rated to carry a limited electrical current. A fuse may prevent damage to the plug 102 by stopping the flow of electrical current in certain instances, for example, a short circuit. In one or more embodiments, a plug 102 may comprise one or more safety pins, for example, pilot pins. A safety pin of a plug 102 may be shorter in length than the power pins of the plug 102. In one or more embodiments, a plug 102 may not make an electrical connection or allow electrical current to flow unless the safety pin is in contact with a conducting material (not shown) of the socket 101. The safety pin may only contact the conducting material of the socket 101 when the pin is at a predetermined, mated position within socket 101. For example, the safety pin may only contact the conducting material when the plug 102 is disposed or positioned at a predetermined distance or threshold within socket 101 such that when the plug 102 is withdrawn greater than the predetermined distance or not positioned or disposed within the predetermined distance the safety pin does not contact the conducting material and no electrical connection between the plug 102 and socket 101 is formed. Safety pins may reduce the possibility of an arc flash, damage to the device or equipment, or an operator coming into contact with an energized portion of the plug 102 or socket 101 by requiring a plug 102 to be positioned or disposed within a predetermined distance or threshold within socket 101 before an electrical current is allowed to flow between the plug 102 and socket 101. Additionally, electrical current may be disconnected should any of the safety pins lose contact or be positioned or disposed less than the predetermined distance or threshold with socket 101.

The cable assembly 100 is illustrated in an inactive configuration in FIG. 1. The inactive configuration allows for transportation or storage of cable assembly 100. The inactive configuration may prevent contamination of or damage to the plugs 101 and sockets 102. In one or more embodiments, one or more plugs 102 may be disposed or positioned in an inactive configuration, for example, coupled to or disposed or positioned within the one or more corresponding sockets 101. For example, plug 102a may be disposed or positioned within socket 101a, plug 102b may be disposed or positioned within in socket 101b, plug 102c may be disposed or positioned within in socket 101c, plug 102d may be disposed or positioned within socket 101d, plug 102e may be disposed or positioned within socket 101e, and plug 101f may be disposed or positioned within socket 101f. While cable assembly 100 is illustrated as comprising three sets of plugs 102 and sockets 101 on each front surface 112, the present disclosure contemplates any number of plugs 102 and sockets 101 configured on any number of front surfaces 112, base surfaces 110, or any other surface.

In one or more embodiments, a socket 101 and a corresponding plug 102 may comprise one or more corresponding characteristics that indicate which plug 102 mates with a particular socket 101. Such one or more characteristics may allow for efficient installation and configuration of the cable assembly 100. The one or more characteristics may comprise any one or more of a label (for example, an alphabetic, numeric, alphanumeric, symbol, icon, or any other type of label), a color, a shading, a striping, an etching, or any other identifier indicative of a mating between a plug 102 and a socket 101. For example, a socket 101 and a corresponding plug 102 may be color coded such that plug 102a and socket 101a may be color coded with a first color, plug 102b and socket 102b may be color coded with a second color, and plug 102c and socket 101c may be color coded with a third color.

One or more cables 103a, 103b, 103c, 103d, 103e, and 103f may be housed, positioned, or disposed within a frame 150. In one or more embodiments, frame 150 may comprise one or more cables 103. The one or more cables 103 may traverse an inner portion (not shown) of frame 150 and couple to one or more plugs 102 via one or more openings 104a, 104b, 104c, 104d, 104e, and 104f (collectively referred to as "openings 104"). For example, cable 103a may couple to cable 103d via openings 104a and 104d. In one or more embodiments, cable 101a and cable 101d are the same cable. In one or more embodiments, one or more cables 103 may couple to one or more other cables 103 via a coupling (not shown) within an inner portion of frame 150. Openings 104 may comprise a grommet, an eyelet, or any other type of aperture which allows one or more cables 103 to pass through. One or more openings 104 may be positioned, disposed, mounted, coupled, or otherwise affixed to, along, or about the frame 150. In one or more embodiments, opening 104 may comprise brass, nickel, metal, copper, or any other type of material. In one or more embodiments, openings 104 may comprise a molding that holds or secures the one or more cables 103 to the frame 150. Securing the one or more cables 103 provides for efficient and effective cable management such that installation and disassembly of site equipment that requires power or communications cabling may be performed quickly and with minimum resources.

Cables 103 may be coupled to one or more corresponding plugs 102. For example, cable 103a may be coupled to plug 102a, cable 103b may be coupled to plug 102b, cable 103c may be coupled to plug 102c, cable 103d may be coupled to plug 102d, cable 103e may be coupled to plug 102e, and cable 103f may be coupled to plug 102f. In one or more embodiments, a cable 103 may comprise at least one of a medium voltage (MV) rated cable, mining grade cable (for example, heavy duty portable (type W), round portable (type G), round portable with ground-check (type G-GC), shielded round portable with ground-check (type SHD-GC), shielded round portable with extensible ground-check (SHD-CGC), diesel locomotive cable (type DLO), service oil, water, and weather resistant (type SOOW)), or any other type of cable. Cable 103 may comprise one or more wires for transmitting power or communications. For example, one or more wires for transmitting power may comprise any one or more of solid core copper wires, insulated stranded copper wires, and any other type of wire for transmitting power and may be dedicated as a hot wire, a ground wire, or a neutral wire. For example, communications may be transmitted over any one or more of an optical fiber, a copper wire, coaxial cable, an unshielded twisted pair or any other wire for transmitting communications.

Figure 2:
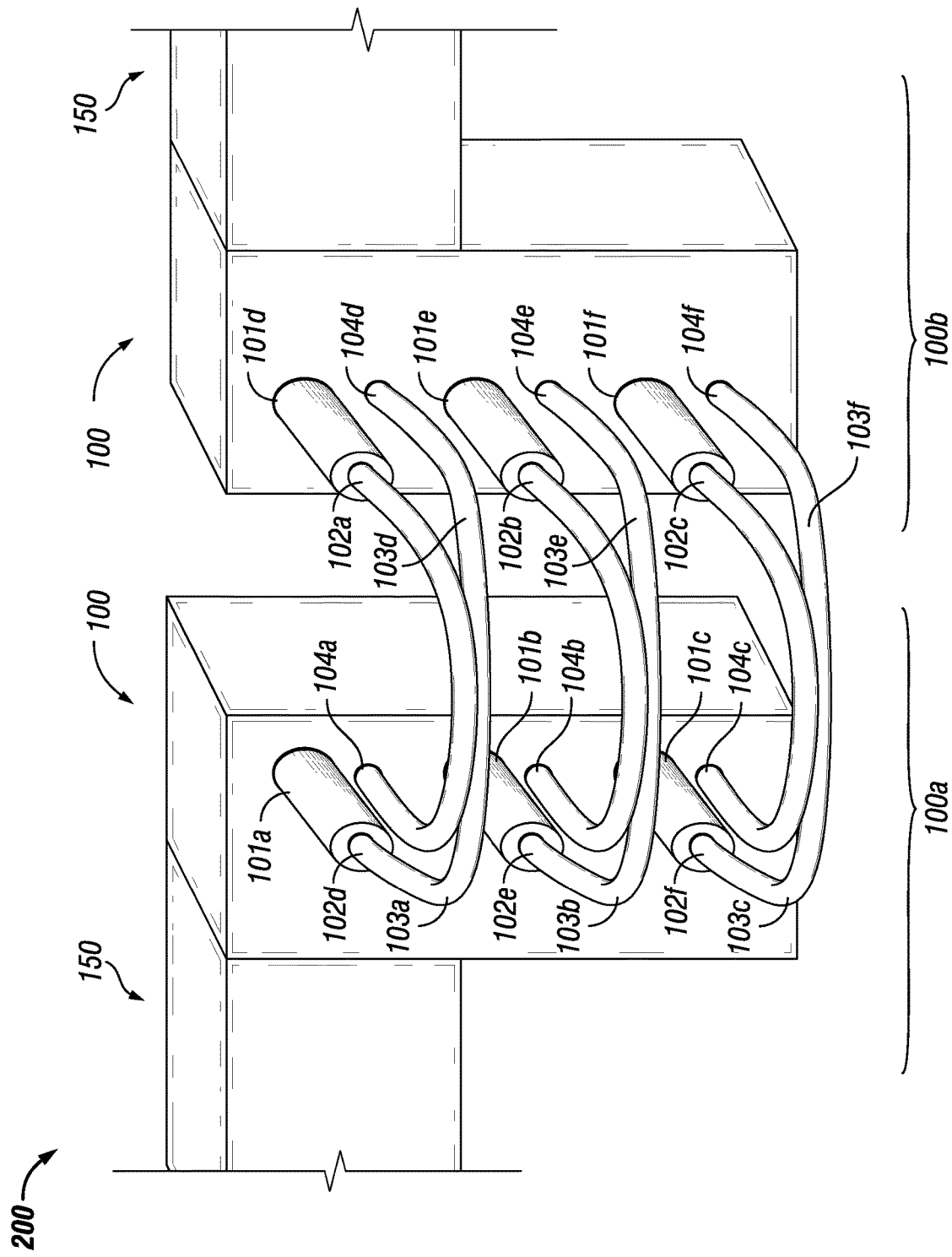
FIG. 2 is a diagram of a plurality of cable assemblies in an active configuration, according to one or more aspects of the present disclosure.

FIG. 2 is a diagram of a plurality of cable assemblies 100 in an active configuration, according to one or more aspects of the present disclosure. The plurality of partial cable assemblies 100 may comprise a first cable assembly 100a and a second cable assembly 100b. One or more plugs 102 may be coupled or mated to one or more corresponding sockets 101. While only three sets of plugs 102 and sockets 101 are depicted in FIG. 2, in one or more embodiments, the cable assembly 100 may comprise any quantity of plugs 102 and corresponding sockets 101 in any configuration or orientation. In one or more embodiments, the first cable assembly 100a may be positioned or disposed at a distance from (such as a close distance to) the second cable assembly 100b. For example, the first cable assembly 100a may be positioned approximately or at one meter from the second cable assembly 100b. In one or more embodiments, the distance may be based, at least in part, on type of equipment, estimated distance between equipment, weight of one or more cables 103, size of frame 150, or any other criteria or factor or any combination thereof. Positioning the first cable assembly 100a and the second cable assembly 100b close to each other allows for quick and easy installation as the cables 103 may be heavy or bulky (for example, cables 103 may weigh 70 pounds. Since at least one end is supported by the equipment, a single operator may be required to lift up to 40 pounds).

In one or more embodiments, a first plug 102a of a first cable assembly 100a may be coupled to a first corresponding socket 101d of a second cable assembly 100b, a second plug 102b of a first cable assembly 100a may be coupled to a second corresponding socket 101e of a second cable assembly 100b, and a third plug 102c of a first cable assembly 100a may be coupled to a third corresponding socket 101f. Similarly, in one or more embodiments, a first plug 102d of a second cable assembly 100b may be coupled to a first corresponding socket 101a of a first cable assembly 100a, a second plug 102e of a second cable assembly 100b may be coupled to a second corresponding socket 101b of a first cable assembly 100a, and a third plug 102f of a second cable assembly 100b may be coupled to a third corresponding socket 101c of a first cable assembly 100a. In one or more embodiments, one or more plugs 102 and one or more sockets 101 may be unused and not coupled to a corresponding socket 101 of a cable assembly 100. For example, a first plug 102a of a first cable assembly 100a may be coupled to corresponding first socket 101d of a second assembly 100b while plugs 102b and 102c of the first cable assembly 100a may be coupled to corresponding sockets 101b and 101c of the first cable assembly 100a.

FIG. 3 is a diagram of a cable assembly system 300, comprising a plurality of cable assemblies 100 in an active configuration, according to one or more aspects of the present disclosure. The plurality of cable assemblies 100 may comprise a first cable assembly 100a, a second cable assembly 100b, and a third cable assembly 100c, coupled to one another via one or more cables 103. For example, a first cable assembly 100a may be coupled to a second cable assembly 100b via one or more cables 103a, 103b, 103c, 103d, 103e, and 103f, and a second cable assembly 100b may be coupled to a third cable assembly 100c via one or more cables 103a, 103b, 103c, 103d, 103e, and 103f. In one or more embodiments, a first cable assembly 100a may be coupled to a power source 480 via one or more cables 103a, 103b, 103c, 103d, 103e, and 103f. In one or more embodiments, cables 103a, 103b, 103c, 103d, 103e, and 103f may each respectively comprise one or more cables. In one or more embodiments, all cables 103a, 103b, 103c, 103d, 103e, and 103f may be active or powered at a first cable assembly 100a. In one or more embodiments, four cables, for example, cables 103b, 103c, 103e, and 103f, may be active or powered at a second cable assembly 100b. In one or more embodiments, two cables, for example, cables 103c and 103f, may be active or powered at a third cable assembly 100c. While only three cable assemblies 100 are depicted in FIG. 3, the present disclosure contemplates that cable assembly system 300 may comprise any number of cable assemblies 100 in any configuration or orientation.

Figure 4A:
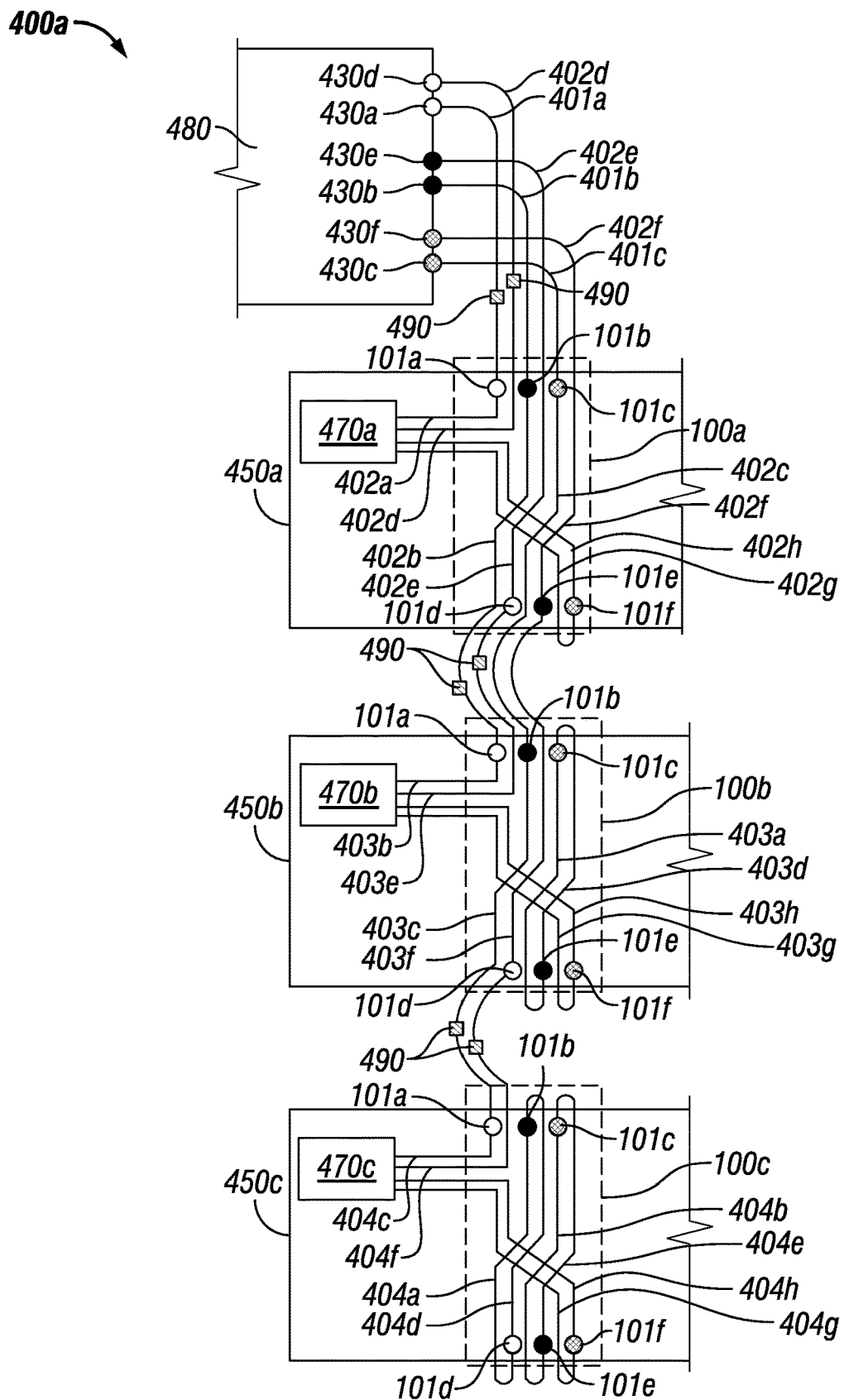
FIG. 4A is a diagram of a cable assembly system for distribution of cables from a source to equipment at a location, according to one or more aspects of the present disclosure.
Figure 4B:
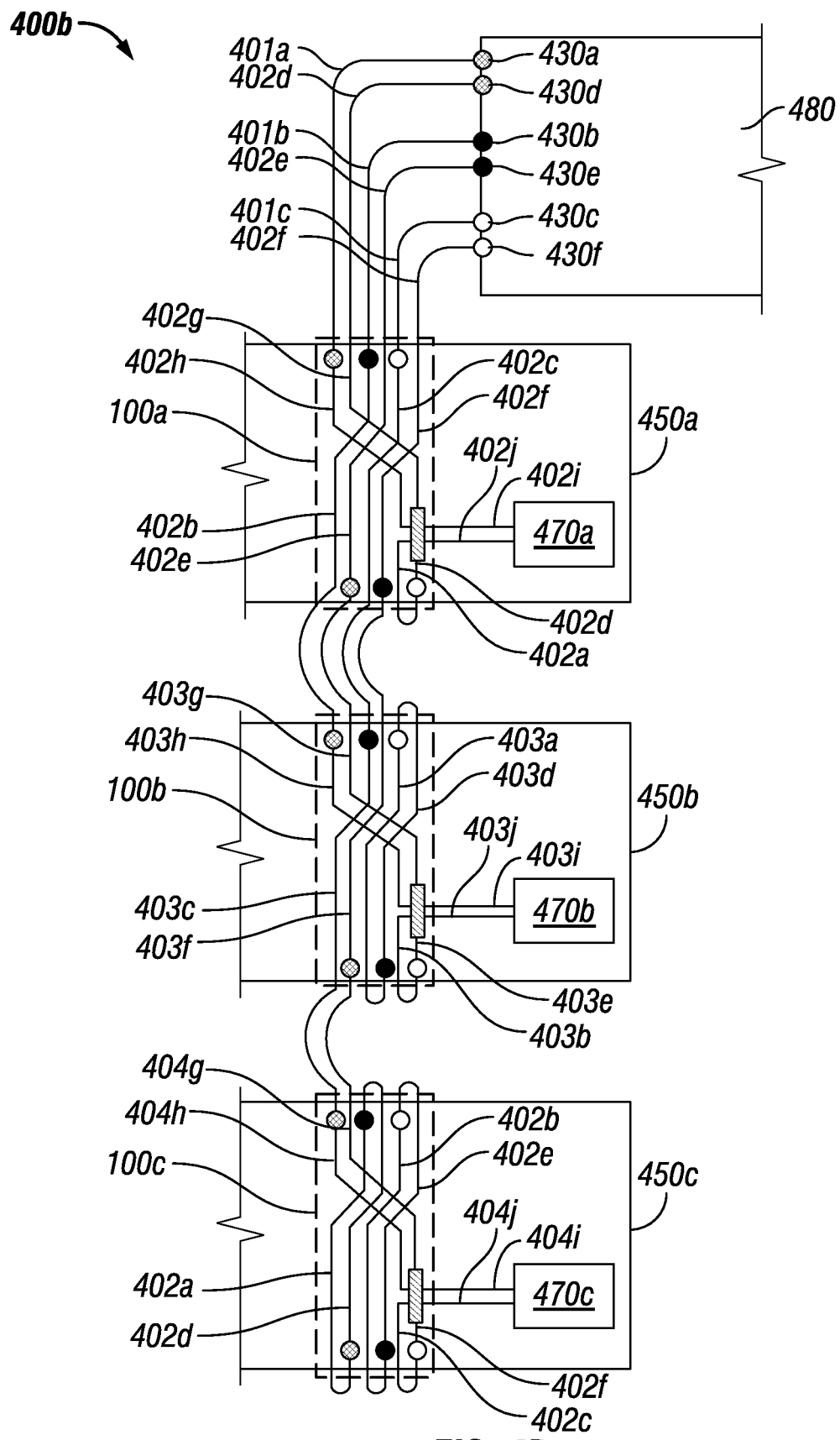
FIG. 4B is a diagram of a cable assembly system for distribution of cables at a location, according to one or more aspects of the present disclosure.

FIG. 4A is a diagram of a cable assembly 400 for distribution of one or more cables. The one or more cables may comprise 401a, 401b, 401c (collectively referred to as "cables 401"), 402a, 402b, 402c, 402d, 402e, 402f (collectively referred to as "cables 402"), 403a, 403b, 403c, 403d, 403e, 403f (collectively referred to as "cables 403"), and 404a, 404b, 404c, 404d, 404e and 404f (collectively referred to as "cables 404") at a location, according to one or more aspects of the present disclosure. In one or more embodiments, cables 401a, 401b, 401c, 402a, 402b, 402c, 402d, 402e, 402f, 403a, 403b, 403c, 403d, 403e, 403f, 404a, 404b, 404c, 404d, 404e, and 404f each respectively comprise one or more cables. FIG. 4A illustrates a power source 480 coupled to one or more cable assemblies 100, for example, cable assembly 100a, cable assembly 100b, and cable assembly 100c. In one or more embodiments, power source 480 may comprise a generator, for example, a natural gas generator, an electric generator, a diesel generator, or any other type of power-generating device. A power source 480 may be disposed or positioned in any orientation or configuration, for example, as illustrated in FIG. 4A and FIG. 4B. In one or more embodiments, power source 480 may be disposed or positioned at any distance from one or more devices or equipment. In one or more embodiments, a power source 480 may be coupled to one or more devices 450. For example, as illustrated in FIG. 4A, power source 480 may be coupled to 450a, 450b, 450c (referred to collectively as "devices 450") via one or more cables 401. For purposes of clarity and illustration, cables 402, 403, and 404 may be an equivalent component to any one or more cables 103 of FIG. 1. Devices 450 may comprise any one or more of a pump, a circulator, a blender, or any other device or equipment that requires a power source 480.

One or more cables 401a, 401b, 401c, 402d, 402e, and 402f may be coupled to power source 480 via one or more connection points 430a, 430b, 430c, 430d, 430e, and 430f (collectively referred to as "connection points 430"). In one or more embodiments, one or more connection points 430 may comprise a receptacle, inlet box, manifold, or any other type of electrical connection. One or more cables 401 may be coupled to any one or more devices 450.

A first cable assembly 100a may be coupled to a power source 480 via one or more cables 401a, 401b, 401c, 402d, 402e, and 402f. For example, cable 401a may be coupled to connection point 430a, cable 401b may be coupled to connection point 430b, cable 401c may be coupled to connection point 430c, cable 402d may be coupled to connection point 430d, cable 402e may be coupled to connection point 430e, and cable 402f may be coupled to connection point 430f. One or more cables 401a, 401b, 401c may be coupled to one or more cables 402a, 402b, 402c via the first cable assembly 100a. For example, cable 401a may be coupled to cable 402a via socket 101a of the first cable assembly 100a, cable 401b may be coupled to cable 402b via socket 101b of the first cable assembly 100a, and cable 401c may be coupled to cable 402c via socket 101c of the first cable assembly 100a.

In one or more embodiments, cables 402a, 402b, 402c, 402d, 402e, and 402f may be at least partially positioned, disposed, or housed within a cable assembly 100, for example, cable assembly 100a. In one or more embodiments, cable 402a may traverse from socket 101a of the first cable assembly 100a and couple to connector 470a of the first device 450a. In one or more embodiments, cable 402d may traverse from connection point 430d of power source 480 and couple to connector 470a of the first device 450a. In one or more embodiments, cables 402a and 402d may couple to a bus bar assembly within cable assembly 100a, and two associated cables (not shown) may couple to connector 470a of the first device 450a. In one or more embodiments, cables 402g and 402h may traverse from connector 470a of the first device 450a to socket 101f of the first cable assembly 100a. In one or more embodiments, cable 402g may couple to cable 402h via socket 101f, which may represent an inactive configuration. In such an inactive configuration, cables 402g and 402h may not be powered or connected to a power source. In one or more embodiments, cable 401a may comprise a corresponding characteristic (for example, a color, symbol, pattern, etc.) as an indicator, for example, an indicator 490 that power is being transmitted or supplied to a device 450a. In one or more embodiments, any one or more cables 402d, 402b, 403e, 403c, and 404f may comprise an indicator 490.

In one or more embodiments, cable 402b may traverse from socket 101b of the first cable assembly 100a and couple to socket 101a of a second cable assembly 100b. In one or more embodiments, cable 402e may traverse from connection point 430e of power source 480 and couple to socket 101d of the first cable assembly 100a. In one or more embodiments, cable 402c may traverse from socket 101c of the first cable assembly 100a and couple to socket 101b of the second cable assembly 100b. In one or more embodiments, cable 402f may traverse from connection point 430f of power source 480 and couple to socket 101e of the first cable assembly 100a. Cables 402b, 402e, 402c, and 402f may traverse through the first cable assembly 100a without powering or coupling to any device 450 or any bus bar assembly. In one or more embodiments, cables 402 may cross with any one or more other cables 402 and traverse through the first cable assembly 100a.

One or more cables 402a, 402b, 402c, 402d, 402e, and 402f may be coupled to one or more cables 403a, 403b, 403c, 403d, 403e, and 403f via the first cable assembly 100a or a second cable assembly 100b. In one or more embodiments, the first cable assembly 100a may be coupled to the second cable assembly 100b via cables 402b, 402e, 402c, 402f, 403b, 403e, 403c, and 403f. For example, cable 402b may be coupled to cable 403b via socket 101a of the second cable assembly 100b, cable 402e may be coupled to cable 403e via socket 101d of the first cable assembly 100a, cable 402c may be coupled to cable 403c via socket 101b of the second cable assembly 100b, and cable 402f may be coupled to cable 403f via socket 101e of the first cable assembly 100a. In one or more embodiments, cables 402g and 402h may not be coupled to cables 403a and 403d. For example, as shown in FIG. 4A, cable 402g may be coupled to cable 402h via socket 101f of the first cable assembly 100a and cable 403a may be coupled to cable 403d via socket 101c of the second cable assembly 100b. Coupling the cables in this way may indicate to an operator or other personnel that the cables are unused or de-energized. In one or more embodiments, cables 402g and 402h may be coupled to cables 403a and 403d, even though the cables 403a and 403d may not be energized or coupled to any device 450. Coupling the cables in this way may be simpler or easier for an operator to quickly operate the system while not having any impact on the system.

In one or more embodiments, cables 403a, 403b, 403c, 403d, 403e, and 403f may be at least partially positioned, disposed, or housed within a cable assembly 100, for example, cable assembly 100b. In one or more embodiments, cable 403b may traverse from socket 101a of the second cable assembly 100b and couple to connector 470b of the second device 450b. In one or more embodiments, cable 403e may traverse from socket 101d of the first cable assembly 100a and couple to connector 470b of the second device 450b. In one or more embodiments, cables 403b and 403e may couple to a bus bar assembly within cable assembly 100b, and two associated cables (not shown) may couple to connector 470b of the second device 450b. In one or more embodiments, cables 403g and 403h may traverse from connector 470b of the second device 450b to socket 101f of the second cable assembly 100b. In one or more embodiments, cable 403g may couple to cable 403h via socket 101f, which may represent an inactive configuration.

In one or more embodiments, cable 403c may traverse from socket 101b of the second cable assembly 100b and couple to socket 101a of the third cable assembly. In one or more embodiments, cable 403f may traverse from socket 101e of the first cable assembly 100a and couple to socket 101d of the second cable assembly 100b. In one or more embodiments, cable 403a may traverse from socket 101c of the second cable assembly 100b to socket 101e of the second cable assembly 100b. In one or more embodiments, cable 403d may traverse from socket 101c of the second cable assembly 100b to socket 101e of the second cable assembly Cables 403a, 403d, 403c, and 403f may traverse through the second cable assembly 100b without powering or coupling to any device 450 or any bus bar assembly. In one or more embodiments, cables 403 may cross with any one or more other cables 402 and traverse through the first cable assembly 100a.

One or more cables 403a, 403b, 403c, 403d, 403e, and 403f may be coupled to one or more cables 404a, 404b, 404c, 404d, 404e, and 404f via the second cable assembly 100b or a third cable assembly 100c. In one or more embodiments, the second cable assembly 100b may be coupled to the third cable assembly 100c via cables 403c, 403f, 404c, and 404f. For example, cable 403c may be coupled to cable 404c via socket 101a of the third cable assembly 100c and cable 403f may be coupled to cable 404f via socket 101d of the second cable assembly 100b. In one or more embodiments, cables 403a, 403d, 403g, and 403h may not be coupled to cables 404a, 404d, 404b, and 404e as illustrated in FIG. 4A. For example, as shown in FIG. 4A, cable 403a may be coupled to cable 403d via socket 101e of the second cable assembly 100b, cable 404a may be coupled to cable 404d via socket 101b of the third cable assembly 100c, cable 403g may be coupled to 403h via socket 101f of the second cable assembly 100b, and cable 404b may be coupled to cable 404e via socket 101c of the third cable assembly 100c. Coupling the cables in this way may indicate to an operator or other personnel that the cables are unused or de-energized. In one or more embodiments, cables 403a, 403*d*, 403*g*, and 403*h* may be coupled to cables 404*a*, 404*d*, 404*b*, and 404*e*, even though the cables 403*a*, 403*d*, 404*a*, 404*d*, 404*b*, and 404*e* may not be energized or coupled to any device 450. Coupling the cables in this way may be simpler or easier for an operator to quickly operate the system while not having any impact on the system.

In one or more embodiments, cables 404*a*, 404*b*, 404*c*, 404*d*, 404*e*, and 404*f* may be at least partially positioned, disposed, or housed within a cable assembly 100, for example, cable assembly 100*c*. In one or more embodiments, cable 404*c* may traverse from socket 101*a* of the third cable assembly 100*c* and couple to connector 470*c* of the third device 450*c*. In one or more embodiments, cable 404*f* may traverse from socket 101*d* of the second cable assembly 100*b* and couple to connector 470*c* of the third device 450*c*. In one or more embodiments, cables 404*c* and 404*f* may couple to a bus bar assembly within cable assembly 100*c*, and two associated cables (not shown) may couple to connector 470*c* of the third device 450*c*. In one or more embodiments cables 404*g* and 404*h* may traverse from connector 470*c* of the third device 450*c* to socket 101*f* of the third cable assembly 100*c*. In one or more embodiments, cable 404*g* may couple to cable 404*h* via socket 101*f*, which may represent an inactive configuration.

In one or more embodiments, cable 404*a* may traverse from socket 101*b* of the third cable assembly 100*c* to socket 101*d* of the third cable assembly 100*c*. In one or more embodiments, cable 404*d* may traverse from socket 101*b* of the third cable assembly 100*c* to socket 101*e* of the third cable assembly 100*d*. In one or more embodiments, cable 404*b* may traverse from socket 101*c* of the third cable assembly 100*c* to socket 101*e* of the third cable assembly 100*c*. In one or more embodiments, cable 404*e* may traverse from socket 101*c* of the third cable assembly 100*c* to socket 101*e* of the third cable assembly 100*c*. Cables 404*a*, 404*d*, 404*b*, and 404*e* may traverse through the third cable assembly 100*c* without powering or coupling to any device 450 or any bus bar assembly. In one or more embodiments, cables 404 may cross with any one or more other cables 404 and traverse through the third cable assembly 100*c* in any position or configuration.

In one or more embodiments, one or more cables 404*a*, 404*b*, 404*c*, 404*d*, 404*e*, and 404*f* may be coupled to one or more cables of a fourth cable assembly (not shown). In one or more embodiments, cables 404*a*, 404*d*, 404*b*, 404*e*, 404*g*, and 404*h* are terminated and thus not coupled to any other one or more cables or devices. For example, as shown in FIG. 4A, cable 404*a* may be coupled to cable 404*d* via socket 101*d* of the third cable assembly 100*c*, cable 404*b* may be coupled to cable 404*e* via socket 101*e* of the third cable assembly 100*c*, and cable 404*g* may be coupled to cable 404*h* via socket 101*f* of the third cable assembly 100*c*. Coupling the cables in this way may indicate to an operator or other personnel that the cables are unused or de-energized.

FIG. 4B is a mirror image of FIG. 4A with the additional feature of a bus bar assembly. A power source 480 may be positioned or disposed in one or more different orientations or configurations in relation to one or more devices 450. In one or more embodiments, one or more cable assemblies 100 may be positioned, disposed, oriented, or configured differently, oppositely, or in any other manner to facilitate the coupling of cables 401, 402, 403, and 404 as described in FIG. 4A. For example, cable assemblies 100*a*, 100*b*, and 100*c* may be rotated, turned, or positioned in an orientation 180 degrees from the orientation of FIG. 4A to produce the configuration shown in FIG. 4B. Such an orientation of cable assemblies 100 may allow for the same or similar couplings of cables 401, 402, 403, and 404 as described in FIG. 4A. For example, in FIG. 4B, cables 402*g* and 402*h* may be coupled to connector 470*a* of the first device 450*a*, cables 403*g* and 403*h* may be coupled to connector 470*b* of the second device 450*b*, and cables 404*g* and 404*h* may be coupled to connector 470*c* of the third device 470*c*. FIG. 4B depicts a bus bar assembly housed in each cable assembly 100*a*, 100*b*, and 100*c*. In one or more embodiments, cables 402*g* and 402*h* may be coupled to the bus bar assembly of the first cable assembly 100*a*, and two associated cables, 402*i* and 402*j*, may be coupled to connector 470*a* of the first device 450*a*. Similarly, cables 403*g*, 403*h*, 404*g*, and 404*h* may be coupled to bus bar assemblies of the second cable assembly 100*b* and the third cable assembly 100*c* respectively; cables 403*i* and 403*j* may be coupled to connector 470*b* of the second device 450*b* and cables 404*i* and 404*j* may be coupled to connector 470*c* of the third device 450*c*.

Figure 5:
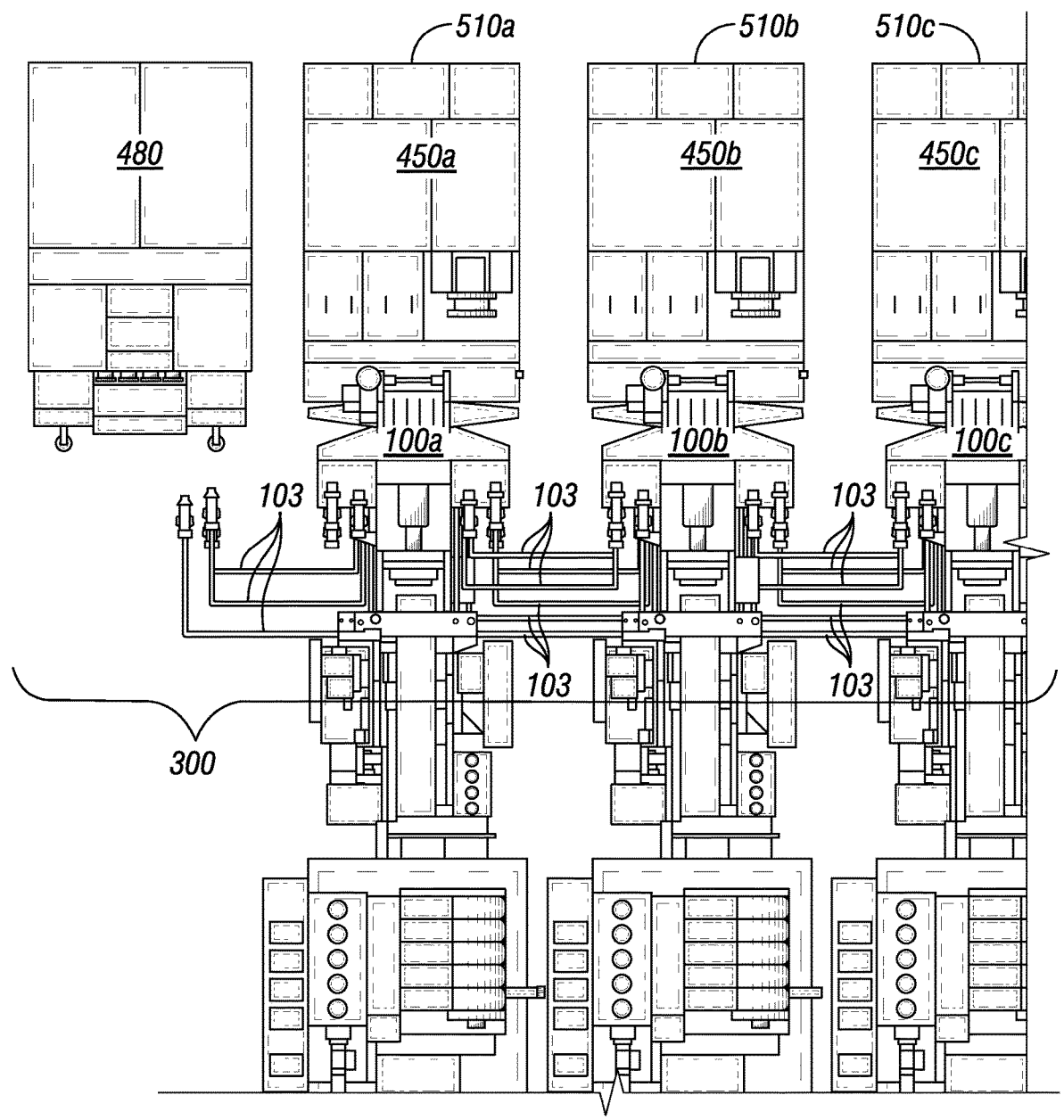
FIG. 5 is a diagram illustrating an overhead view of a cable assembly system for distribution of cables at a location, according to one or more aspects of the present disclosure.

FIG. 5 is a diagram illustrating an overhead view of a cable assembly system 300, comprising a plurality of cable assemblies 100*a*, 100*b*, and 100*c* (collectively, cable assemblies 100) and a plurality of devices 450*a*, 450*b*, 450*c* (collectively, devices 450), according to the aspects of the present disclosure. The plurality of cable assemblies 100 may comprise a first a second cable assembly 100*b* coupled between a first cable assembly 100*a*, and a third cable assembly 100*c* via one or more cables 103. In one or more embodiments, cables 103 may be coupled to one or more cable assemblies 100 and one or more devices 450 according to the cabling configuration described with respect to FIG. 4A and FIG. 4B. In one or more embodiments, one or more cable assemblies 100 may be mounted, hitched, attached, or otherwise coupled to one or more devices 450 or one or more trailers 510*a*, 510*b*, and 510*c* (collectively, trailers 510). A trailer 510 may comprise one or more devices 450 and one or more corresponding cable assemblies 100. For example, trailer 510*a* may comprise a device 450*a* and a cable assembly 100*a*. One or more trailers 510 may be configured or positioned in parallel as shown in FIG. 5, or in any other configuration or position. In one or more embodiments, one or more trailers 510 may be positioned in close proximity to one another to facilitate quick and easy installation of cables 103 to cable assemblies 100. In one or more embodiments, cable assembly 100*a* may be coupled to device 450*a*, cable assembly 100*b* may be coupled to device 450*b*, and cable assembly 100*c* may be coupled to device 450*c*. In one or more embodiments, the first cable assembly 100*a* may be coupled to a power source 480 via one or more cables 103. In one or more embodiments, the power source 480 may be located in a different position, for example, near the third cable assembly 100*c*. In one or more embodiments, the power source 480 may be coupled to one or more trailers 510. In one or more embodiments, the power source 480 may be used for more than one cable assembly system 300. In one or more embodiments, the cable assembly system 300 may comprise any number of cable assemblies 100, devices 450, and trailers 510 in any configuration or orientation.

What is claimed is:

1. A cable system comprising:
   a cable housing, wherein the cable housing comprises one or more middle supports disposed between a first side support and a second side support;
   one or more first side support sockets disposed on the first side support;
   one or more second side support sockets disposed on the second side support;

a first cable coupled to the first side support, wherein the first cable repositionably couples the first side support to at least one of the one or more first side support sockets of the first side support, the one or more second side support sockets of the second side support, or a device; and a second cable coupled to the first side support, wherein the second cable repositionably couples the first side support to at least one of the one or more first side support sockets, the one or more second side support sockets, or a device.

2. The cable system of claim 1, wherein the cable housing is coupled to a second cable housing via the first cable.

3. The cable system of claim 1, wherein the one or more first side support sockets are positioned vertically about a front surface of the first side support.

4. The cable system of claim 1, wherein the device comprises a power generation device.

5. The cable system of claim 1, wherein at least one of the first cable and the second cable comprises an indicator.

6. The cable system of claim 1, wherein the first cable comprises a plug, and wherein the first cable repositionably couples the first side support to at least one of the one or more first side support sockets, the one or more second side support sockets, or the device via the plug.

7. The cable system of claim 1, wherein the first side support comprises one or more openings.

8. The cable system of claim 1, wherein the cable housing comprises a first cable housing and a second cable housing, the first cable housing coupled to the device via at least one of the first cable and the second cable and to the second cable housing via a third cable.

9. The cable system of claim 1, wherein the first cable transfers power from the first side support to the second side support.

10. The cable system of claim 1, wherein the first cable communicates information from the first side support to the second side support.

11. A cabling method for coupling one or more devices comprising:
coupling a first cable assembly to a first device via a first cable;
coupling a second cable assembly to a second device via a third cable; and
coupling a second cable of the first cable assembly to the second cable assembly; and
coupling a fourth cable of the second cable assembly to a third cable assembly, wherein the third cable assembly is coupled to a third device.

12. The method of claim 11, further comprising transferring power to the second device via the second cable, wherein the first device comprises a power generation device.

13. The method of claim 11, further comprising transferring data to the second device via the second cable, wherein the first device comprises an information handling system.

14. The method of claim 11, further comprising coupling the first cable assembly to a power generation device via a plug of the first cable.

15. A cable system comprising:
a first cable assembly, wherein the first cable assembly comprises a cable housing, one or more cables, and one or more sockets, and wherein the first cable assembly is coupled to a first device;
a second cable assembly, wherein the second cable assembly comprises a cable housing, one or more cables, and one or more sockets, and wherein the second cable assembly is coupled to the first cable assembly;
a second device, wherein the second device is coupled to the first cable assembly; and
third device, wherein the third device is coupled to the second cable assembly; and
a third cable assembly, wherein the third cable assembly is coupled to the second cable assembly.

16. The system of claim 15, wherein the first device comprises a power generator.

17. The system of claim 15, wherein the first device comprises a communication device.

18. The system of claim 15, wherein the first cable assembly and the second cable assembly are aligned on a horizontal plane.

19. The system of claim 15, further comprising a fourth device, wherein the fourth device is coupled to the third cable assembly, and
wherein the first device comprises a power source, and
wherein the second, third, and forth devices are each independently selected from the group consisting of a pump, a circulator, and a blender.

20. The system of claim 19, wherein the system is configured to provide power from the power source to the second, third, and forth devices during a well services or production operation.

21. The system of claim 20, wherein the first cable assembly and second device are supported on a first trailer, the second cable assembly and third device are supported on a second trailer, and the third cable assembly and third device are supported on a third trailer, and
wherein the first, second, and third trailers are positioned adjacent each other at a well services or production location.

22. The system of claim 21, wherein the second, third, and forth devices are stimulation pumps.

23. The system of claim 15, further comprising a fourth device, wherein the fourth device is coupled to the third cable assembly, and
wherein the first device comprises a communication device, and
wherein the second, third, and forth devices are each independently selected from the group consisting of a pump, a circulator, and a blender.

24. The system of claim 23, wherein the system is configured to provide control signals from the communication device to the second, third, and forth devices during a well services or production operation.

25. The system of claim 24, wherein the first cable assembly and second device are supported on a first trailer, the second cable assembly and third device are supported on a second trailer, and the third cable assembly and third device are supported on a third trailer,
wherein the first, second, and third trailers are positioned adjacent each other at a well services or production location; and
wherein the second, third, and forth devices are stimulation pumps.

* * * * *